US012394397B2

(12) United States Patent
Gillis

(10) Patent No.: US 12,394,397 B2
(45) Date of Patent: Aug. 19, 2025

(54) SYSTEM AND METHOD OF A TWENTY-SECOND FRET TEMPORARILY INSTALLABLE ON A TWENTY-ONE FRET ELECTRIC GUITAR

(71) Applicant: Brad Gillis, Lafayette, CA (US)

(72) Inventor: Brad Gillis, Lafayette, CA (US)

( * ) Notice: Subject to any disclaimer, the term of this patent is extended or adjusted under 35 U.S.C. 154(b) by 212 days.

(21) Appl. No.: 18/228,515

(22) Filed: Jul. 31, 2023

(65) Prior Publication Data

US 2025/0046274 A1 Feb. 6, 2025

(51) Int. Cl.
*G10D 3/06* (2020.01)

(52) U.S. Cl.
CPC ...................................... *G10D 3/06* (2013.01)

(58) Field of Classification Search
CPC ........................................................ G10D 3/06
See application file for complete search history.

(56) References Cited

U.S. PATENT DOCUMENTS 6,323,409 B1 * 11/2001 Surber ..................... G10D 3/00
84/319
2025/0046274 A1 * 2/2025 Gillis ....................... G10D 3/06

* cited by examiner

*Primary Examiner* — Robert W Horn

(57) ABSTRACT

A portable enhancement system for electric guitars is provided. The system comprises a concave device removably installed over a heel area of a neck of an electric guitar, clips on each end of the device, and a spring attached to a surface of the device facing a pickup of the guitar. The system also comprises a brass surface of the device functioning as an additional fret, the brass surface of similar length and parallel to permanent frets of the guitar. The length of the device equates to the width of the heel. The guitar is manufactured with twenty-one frets and the device provides a twenty-second fret. The spring presses against the pickup and simultaneously presses the device against the heel. Pressure exerted by the spring maintains placement of the device against the heel. Inside surfaces of the concave device are shaped to match a shape of the heel.

20 Claims, 5 Drawing Sheets

SYSTEM AND METHOD OF A TWENTY-SECOND FRET TEMPORARILY INSTALLABLE ON A TWENTY-ONE FRET ELECTRIC GUITAR

CROSS REFERENCE TO RELATED APPLICATIONS

None

FIELD OF THE DISCLOSURE

The present disclosure is in the field of electric guitars. More particularly, the present disclosure provides systems and methods of a removeable device attached to a guitar with twenty-one frets to provide a temporary twenty-second fret, the device attached to the heel of a neck of the guitar and secured in place by a spring on the device that contacts and presses against the pickup of the guitar.

BACKGROUND

Electric guitars manufactured by Fender and others are provided with twenty-one frets as a standard configuration. Guitars are by default tuned to the key of E with the twenty-first and bottom-most fret providing the last note in the key of C sharp. On such twenty-one fret guitars, to “bend up” or reach the key of E, a musician must bend up three notes: from E to D, from D to E flat, and from E flat to E. On a guitar with twenty-two frets, the musician must bend up by only two notes, from D to E flat and from E Flat to E. It may therefore be advantageous for an electric guitar to have a twenty-second fret.

DETAILED DESCRIPTION

Figure 1:
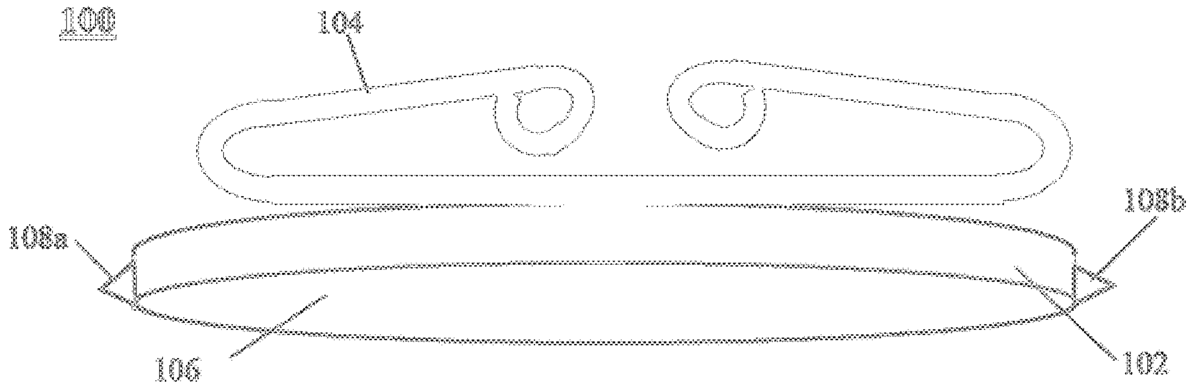
FIG. 1 is a block diagram of a temporary twenty-second fret according to an embodiment of the present disclosure.

Systems and methods described herein provide a device for adding a twenty-second fret to electric guitars manufactured with twenty-one frets, for example the Fender Stratocaster and Fender Telecaster guitars. The device, which may be referred to commercially as the XtraFret, is made primarily of brass. The device is concave in shape and fits to the heel or bottom of the guitar neck, immediately below the twenty-first or highest fret on the neck.

A spring is attached to the device and makes contact with the guitar’s pickup just a short distance from the device’s position at the heel. The spring presses against the pickup and is compressed between the pickup and the device such that it exerts pressure against the device. This exerted pressure gently pushes the device against the heel and maintains it there.

The heel, (sometimes referred to as a neck joint) is the bottom end of the neck of the guitar and may be the point at which the neck is either bolted or glued to the body of the guitar. Most acoustic steel-string guitars have glued (otherwise known as set) necks, while electric guitars are constructed using both types. Bolt-on necks may offer greater flexibility in the guitar’s set-up, and allow easier access for neck joint maintenance and repairs. Another type of neck, only available for solid-body electric guitars, is the neck-through-body construction. These are designed so that everything from the machine heads down to the bridge is located on the same piece of wood. The sides (also known as wings) of the guitar are then glued to this central piece. Some luthiers prefer this method of construction as they claim it allows better sustain of each note. Some instruments may not have a neck joint at all, having the neck and sides built as one piece and the body built around it.

While in use, such as during a course of a concert for example, an electric guitar may be actively moved about by musicians, roadies, stage handlers, backstage personnel and others such that the device might come loose from the heel without such spring mechanism and pressure. The musician need not be concerned that the device detaches from the heel although the device in many cases may be removed from the guitar when not in use.

The device additionally has wings, ears, clips or similar mechanisms on its ends. These components grasp the neck of the guitar and further assist in holding the device in place on the heel.

The length of the device, which is positioned across the neck, is about the same as the width of the neck at the heel area. Several models of the device may be provided based on differences in physical characteristics of the heel of the particular guitar involved. Some Fender and other guitars have heels that are curved and others have heels with straighter edges.

The shaping of the internal surfaces of the concave portions of the device may be configured to accommodate such differences in heel physical characteristics. An objective herein is that the device fits snugly over the heel. The device may be shaped with a 7.25 radius curve, exactly or closely matching the neck curvature of most or all Fender guitars.

Turning to the figures, FIG. 1 is a diagram of the temporary twenty-second fret provided herein, depicted as a system 100. The system 100 comprises a body 102 made entirely or primarily of brass and a spring 104 made of steel or similar material. The spring 104 is attached to the body 102 via welding or other method. A concave area 106 is the portion of the body 102 into which the heel of the guitar fits. Because the heel of most or all Fender guitars is slightly raised above the surface of the pick guard, the heel may fit snugly into the concave area 106.

The device may be easily installed by sliding the device underneath the strings of the guitar into the area between the heel and the pickup and snapping the device into place on the heel. Wings, ears, or clips 108*a-b* are also depicted in FIG. 1.

Figure 2:
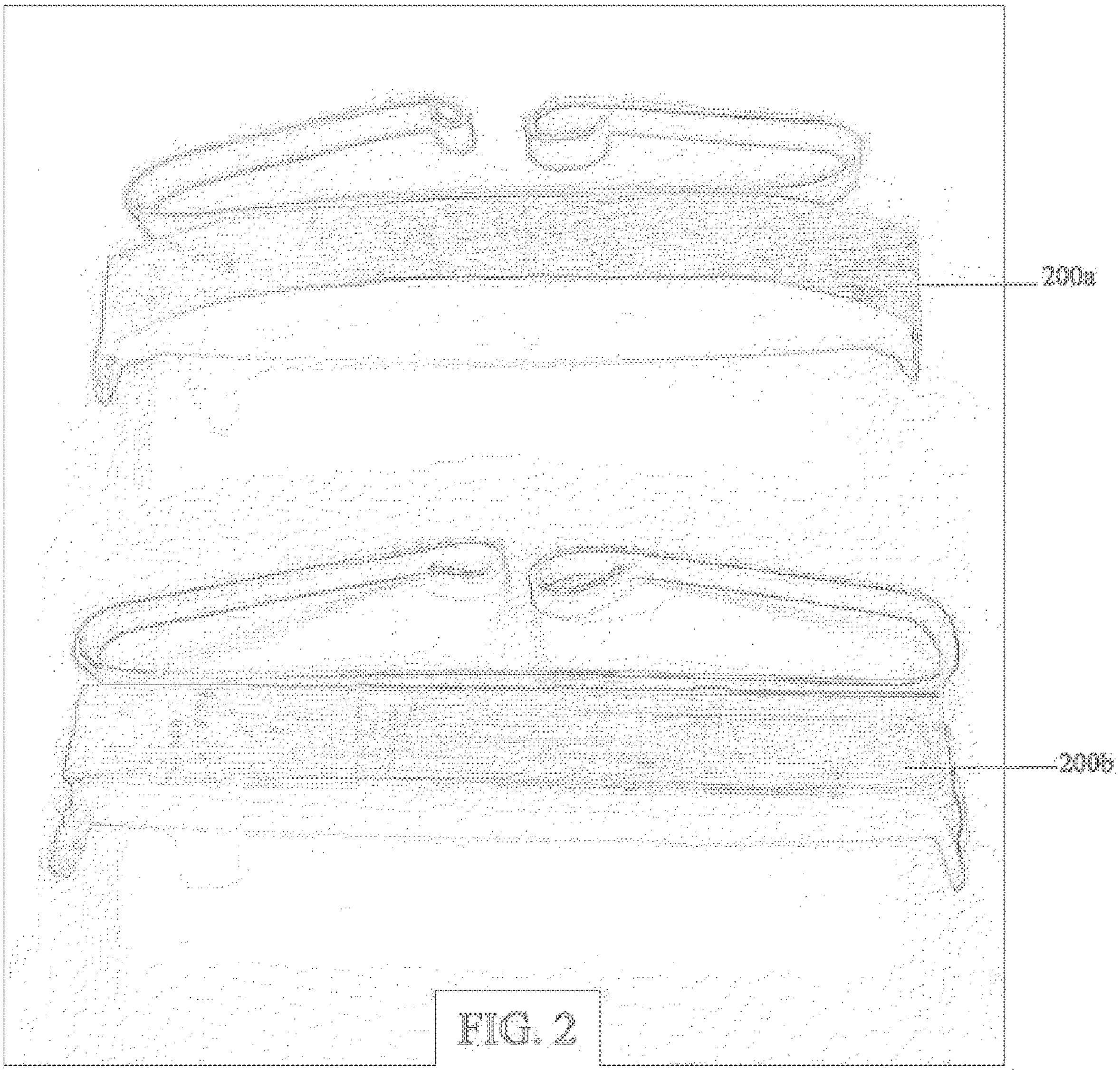
FIG. 2 is an image of two temporary twenty-second frets according to embodiments of the present disclosure.

FIG. 2 is an image of two different embodiments of the device. Device 200*a* has a curved body and device 200*b* has a straighter body. Each is constructed to fit a different sized and shaped heel of a Fender or other electric guitar.

Figure 3:
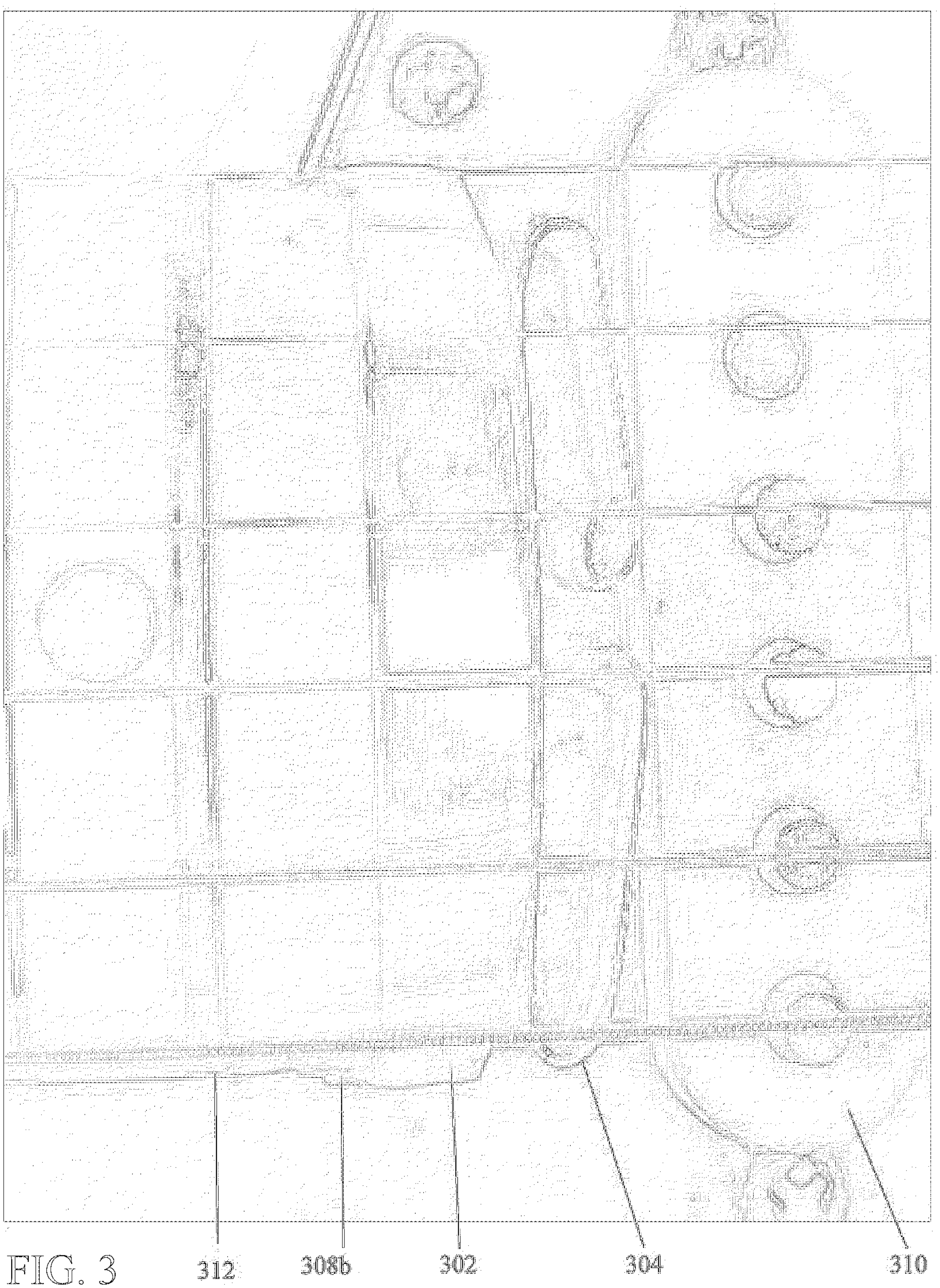
FIG. 3 is an image of a temporary twenty-second fret in installed position according to an embodiment of the present disclosure.

FIG. 3 is an image of the device installed in place on the heel of an electric guitar with components indexed to those in FIG. 1 and the system 100. FIG. 3 depicts the body 302, the spring 304, and the clip 308*b*. While not part of the device, FIG. 3 also depicts the pickup of the guitar and the twenty-first fret 312. As is visible in FIG. 3, the body is of brass construction.

Figure 4:
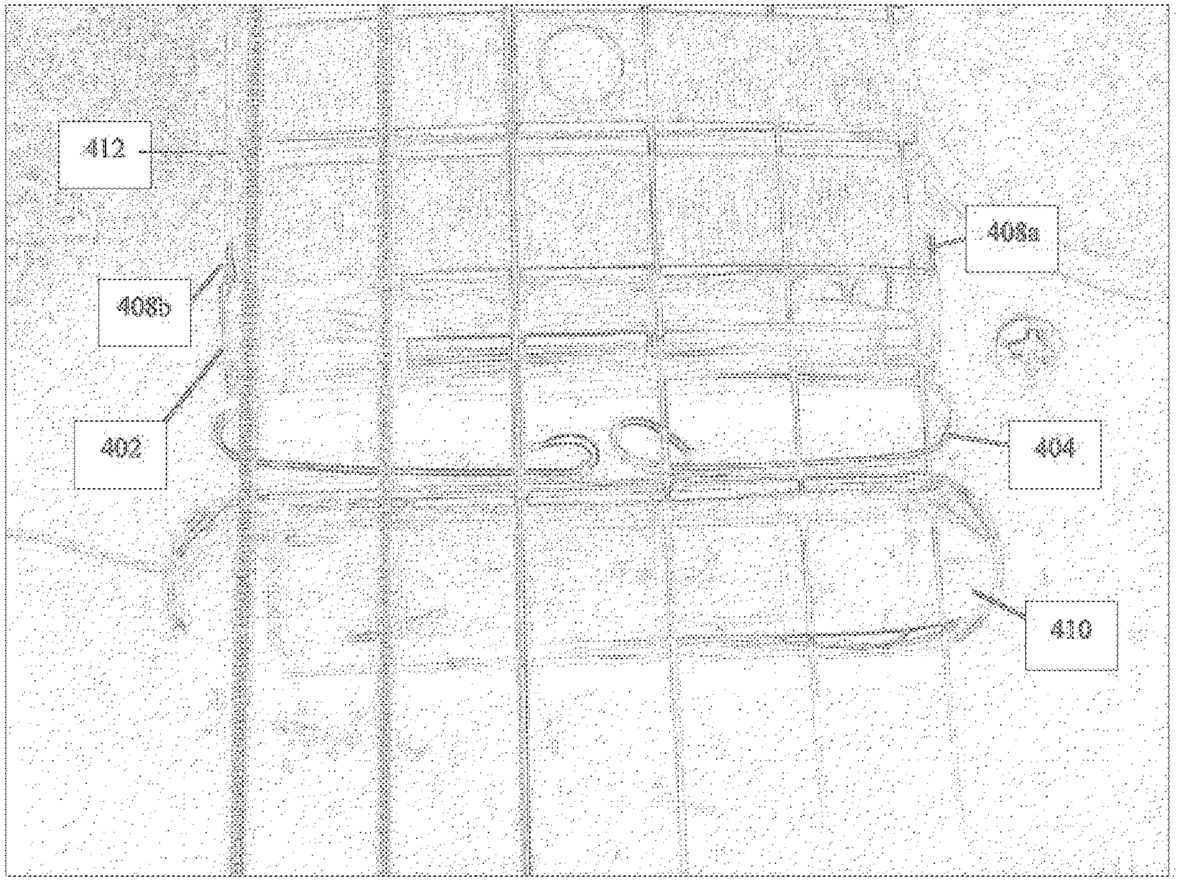
FIG. 4 is an image of a temporary twenty-second fret in installed position according to an embodiment of the present disclosure.

FIG. 4, similar to FIG. 3, is an image of the device installed in place on the heel of an electric guitar with components indexed to those in FIG. 1 and the system 100. FIG. 3 depicts the body 402, the spring 404, and the clips 408*a-b*. While not part of the device, FIG. 4 also depicts the pickup of the guitar 410 and the twenty-first fret 412.

Figure 5:
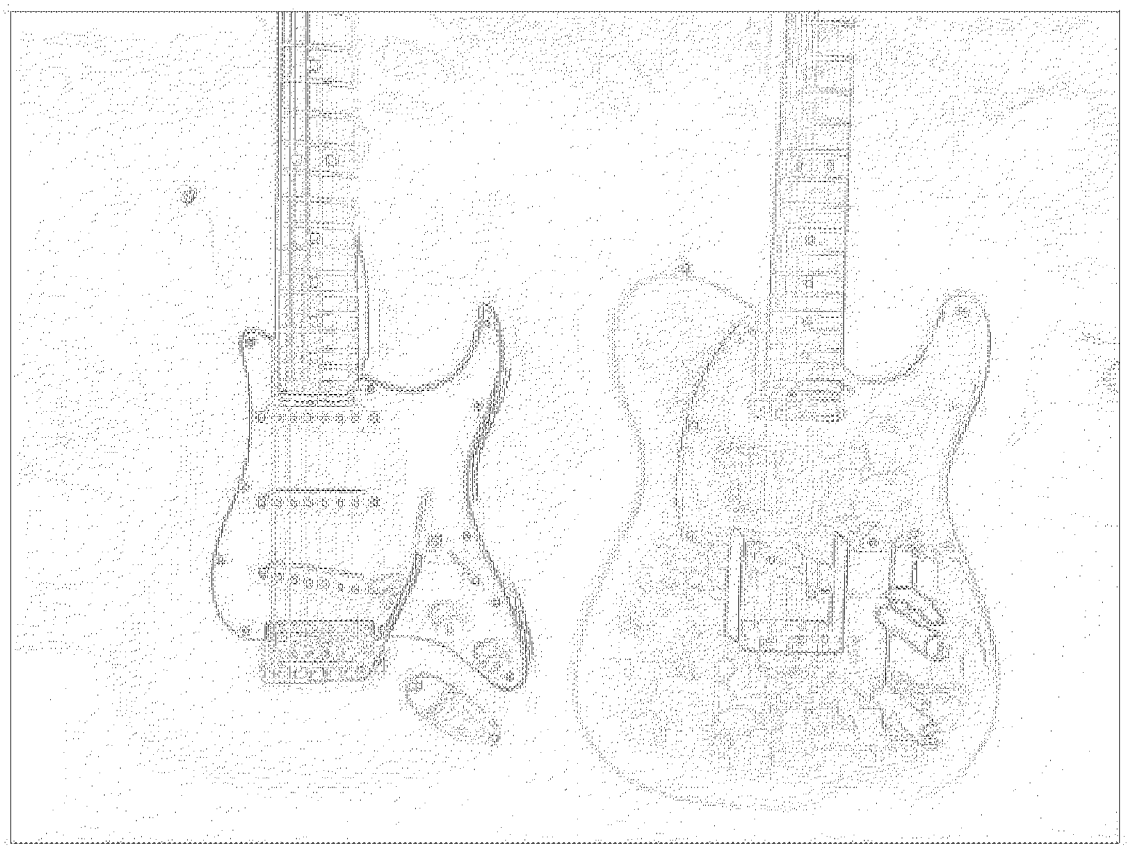
FIG. 5 is an image of two electric guitars with temporary twenty-second frets in installed position according to embodiments of the present disclosure.

FIG. 5 is an image of two Fender guitars, each with the device in place.

While the present disclosure has presented the device in primary embodiments as constructed primarily of brass and concave in shape, in other embodiments the device may be made of other materials such as other types of materials comprising other metals, wood, plastic, or composite materials. Additionally, the shape of the device may not be concave and may instead be shaped in another manner and may attach to the neck and the heel in different manner not involving covering the heel as in primary embodiments. Further, the spring mechanism provided herein to be positioned between the device and the pickup to press the device against the heel may not be used and another system may be used to hold the device in place.

In an embodiment, a portable enhancement system for electric guitars is provided. The system comprises a concave device removably installed over a heel area of a neck of an electric guitar, clips on each end of the device, and a spring attached to a surface of the device facing a pickup of the guitar. The system also comprises a brass surface of the device functioning as an additional fret, the brass surface of similar length and parallel to permanent frets of the guitar.

The length of the device equates to the width of the heel. The guitar is manufactured with twenty-one frets and the device provides a twenty-second fret.

The spring presses against the pickup and simultaneously presses the device against the heel. Pressure exerted by the spring is directed to maintaining placement of the device against the heel.

Inside surfaces of the concave device are shaped to match a shape of the heel. Curvature of the brass surface matches a curvature of the heel.

The device is slid underneath strings of the guitar between the heel and the pickup for installation and removal. The clips on each end attach to the neck to further secure the device against the neck and the heel.

In another embodiment, a system for extending electric guitar functionality is provided. The system comprises an electric guitar, a neck component of the guitar manufactured with twenty-one frets, and a concave device removably attached to a heel of the neck component that functions as a twenty-second fret and secures to the heel via a spring on the device exerting pressure against a pickup of the guitar.

An inside area of the concave device is shaped to match a shape of the heel. The pressure exerted by the spring causes pressure against the device, the pressure against the device directed to maintaining secure placement of the device against the heel.

The concave device is made at least partially of brass and is of similar length as a width of the heel. Clips on each end of the device attach to the neck to further secure the device against the neck and the heel.

In yet another embodiment, a method of enhancing usability and performance of electric guitars is provided. The method comprises a device receiving initial placement below strings of an electric guitar, a location of the initial placement between the heel and a pickup of the guitar. The method further comprises the device receiving further placement over the heel, wherein a concave portion of the device fits over the heel. The method further comprises the device receiving, via a spring attached to the device and pressing against the pickup, pressure against the heel, the pressure holding the device in place against the heel.

The method further comprises the device functioning as a twenty-second fret when the guitar is manufactured with twenty-one frets. At least a surface of the device facing strings of the guitar and functioning as the twenty-second fret is made of brass.

The device has curved surfaces inside the concave portion, the curved surfaces shaped to match a shape of the heel. The device is slid underneath strings of the guitar between the heel and the pickup for installation and removal. The method further comprises the device maintaining placement against the heel via clips on each end of the device attaching to sides of a neck of the guitar.

What is claimed is:

1. A portable enhancement system for electric guitars, comprising:

a concave device removably installed over a heel area of a neck of an electric guitar;

clips on each end of the device;

a spring attached to a surface of the device facing a pickup of the guitar; and a brass surface of the device functioning as an additional fret, the brass surface of similar length and parallel to permanent frets of the guitar.

2. The system of claim 1, wherein the length of the device equates to the width of the heel.

3. The system of claim 1, wherein the guitar is manufactured with twenty-one frets and the device provides a twenty-second fret.

4. The system of claim 1, wherein the spring presses against the pickup and simultaneously presses the device against the heel.

5. The system of claim 4, wherein the pressure exerted by the spring is directed to maintaining placement of the device against the heel.

6. The system of claim 1, wherein inside surfaces of the concave device are shaped to match a shape of the heel.

7. The system of claim 1, wherein a curvature of the brass surface matches a curvature of the heel.

8. The system of claim 1, wherein the device is slid underneath strings of the guitar between the heel and the pickup for installation and removal.

9. The system of claim 1, wherein the clips on each end attach to the neck to further secure the device against the neck and the heel.

10. A system for extending electric guitar functionality, comprising:

an electric guitar;

a neck component of the guitar manufactured with twenty-one frets; and a concave device removably attached to a heel of the neck component that:

functions as a twenty-second fret, and secures to the heel via a spring on the device exerting pressure against a pickup of the guitar.

11. The system of claim 10, wherein an inside area of the concave device is shaped to match a shape of the heel.

12. The system of claim 10, wherein the pressure exerted by the spring causes pressure against the device, the pressure against the device directed to maintaining secure placement of the device against the heel.

13. The system of claim 10, wherein the concave device is made at least partially of brass and is of similar length as a width of the heel.

14. The system of claim 10, wherein clips on each end of the device attach to the neck to further secure the device against the neck and the heel.

15. A method of enhancing usability and performance of electric guitars, comprising:

a device receiving initial placement below strings of an electric guitar, a location of the initial placement between the heel and a pickup of the guitar;

the device receiving further placement over the heel, wherein a concave portion of the device fits over the heel; and the device receiving, via a spring attached to the device and pressing against the pickup, pressure against the heel, the pressure holding the device in place against the heel.

16. The method of claim 15, further comprising the device functioning as a twenty-second fret when the guitar is manufactured with twenty-one frets.

17. The method of claim 15, wherein at least a surface of the device facing strings of the guitar and functioning as the twenty-second fret is made of brass.

18. The method of claim 10, further comprising the device having curved surfaces inside the concave portion, the curved surfaces shaped to match a shape of the heel.

19. The method of claim 15, wherein the device is slid underneath strings of the guitar between the heel and the pickup for installation and removal.

20. The method of claim 15, further comprising the device maintaining placement against the heel via clips on each end of the device attaching to sides of a neck of the guitar.

* * * * *